US012671649B2

(12) United States Patent
Holness et al.

(10) Patent No.: US 12,671,649 B2
(45) Date of Patent: Jun. 30, 2026

(54) RELATIVE FAULT-TOLERANT SWITCHING AMONG DEGRADED REDUNDANT COMMUNICATION PATHS

(71) Applicant: CIENA CORPORATION, Hanover, MD (US)

(72) Inventors: Marc Holness, Ottawa (CA); Himanshu Shah, Hopkinton, MA (US)

(73) Assignee: CIENA CORPORATION, Hanover, MD (US)

( * ) Notice: Subject to any disclaimer, the term of this patent is extended or adjusted under 35 U.S.C. 154(b) by 134 days.

(21) Appl. No.: 18/595,949

(22) Filed: Mar. 5, 2024

(65) Prior Publication Data

US 2025/0286813 A1 Sep. 11, 2025

(51) Int. Cl.
*H04L 45/00* (2022.01)
*H04L 45/02* (2022.01)
*H04L 45/851* (2022.01)
(52) U.S. Cl.
CPC .............. *H04L 45/22* (2013.01); *H04L 45/02* (2013.01); *H04L 45/70* (2013.01); *H04L 45/851* (2022.05)
(58) Field of Classification Search
CPC ......... H04L 45/22; H04L 45/02; H04L 45/70; H04L 45/851
See application file for complete search history.

(56) References Cited

U.S. PATENT DOCUMENTS 6,510,219 B1 * 1/2003 Wellard ................ H04M 7/006
379/900

FOREIGN PATENT DOCUMENTS

CN 112822102 A * 5/2021 ........... H04L 45/302
WO WO-2022007244 A1 * 1/2022 ............ H04W 40/12

OTHER PUBLICATIONS

N. Wang, W. Xue, J. Huang, X. Yang and Y. Liang, "Alternate routing optimization method for power communication network," 2019 6th International Conference on Information Science and Control Engineering (ICISCE), Shanghai, China, 2019, pp. 986-990. (Year: 2019).*

(Continued)

*Primary Examiner* — Messeret F Gebre
(74) *Attorney, Agent, or Firm* — Guntin & Gust, PLC; Ralph Trementozzi

(57) ABSTRACT

Aspects of the subject disclosure may include, for example, identifying a current communication path and a group of alternate communication paths extending between the first and second communication devices. The current communication path is configured to support exchanges of information between the first and second communication devices according to a communication service. A partial degradation of the current communication path is detected according to a first degradation severity rating and responsive to the detecting, the first degradation severity rating is compared to a group of alternate degradation severity ratings each corresponding to a respective alternate communication path of the group of alternate communication paths. An alternate communication path of the group of alternate communication paths is selected, for the communication service, having a second degradation severity rating less than the first degradation severity rating. Other embodiments are disclosed.

19 Claims, 6 Drawing Sheets

(56)         References Cited

OTHER PUBLICATIONS

C. Fan, B. Guo, H. Wu and Z. Fang, "A Path Selection Method for Wide-area Protection Communication System in Smart Grids," 2022 IEEE 10th Joint International Information Technology and Artificial Intelligence Conference (ITAIC), Chongqing, China, 2022, pp. 1431-1435. (Year: 2022).*

* cited by examiner

100

150

300

400

452

Identifying Path Segments Of Protection Group

454

Monitor Current Path Segment

456

SD Condition Detected for Current Path Segment?    N

Y

458

Obtain SD Status Of Partially Degraded Redundant Path Segments

460

SD-Severity(Current Path) ≥ SD-Severity(Alternate Path)?    Y

N

462

Select Alternate Path for Switchover from Current Path Segment → Alternate Path Segment <u>450</u>

RELATIVE FAULT-TOLERANT SWITCHING AMONG DEGRADED REDUNDANT COMMUNICATION PATHS

FIELD OF THE DISCLOSURE

The subject disclosure relates to relative fault-tolerant switching among degraded redundant communication paths.

BACKGROUND

Fault-tolerant communication systems may deploy multiple redundant communication components to allow for a switching of operations from one component to another in response to detection of a fault. In some instances, a fault-tolerant communication system may include multiple redundant communication paths or path segments. Such systems may monitor a communication status of a current path segment and, in response to detecting a faulty condition or failure, and transition communications from the current path segment to one of the redundant communication path segments.

BRIEF DESCRIPTION OF THE DRAWINGS

Reference will now be made to the accompanying drawings, which are not necessarily drawn to scale, and wherein.

DETAILED DESCRIPTION

Figure 1A:
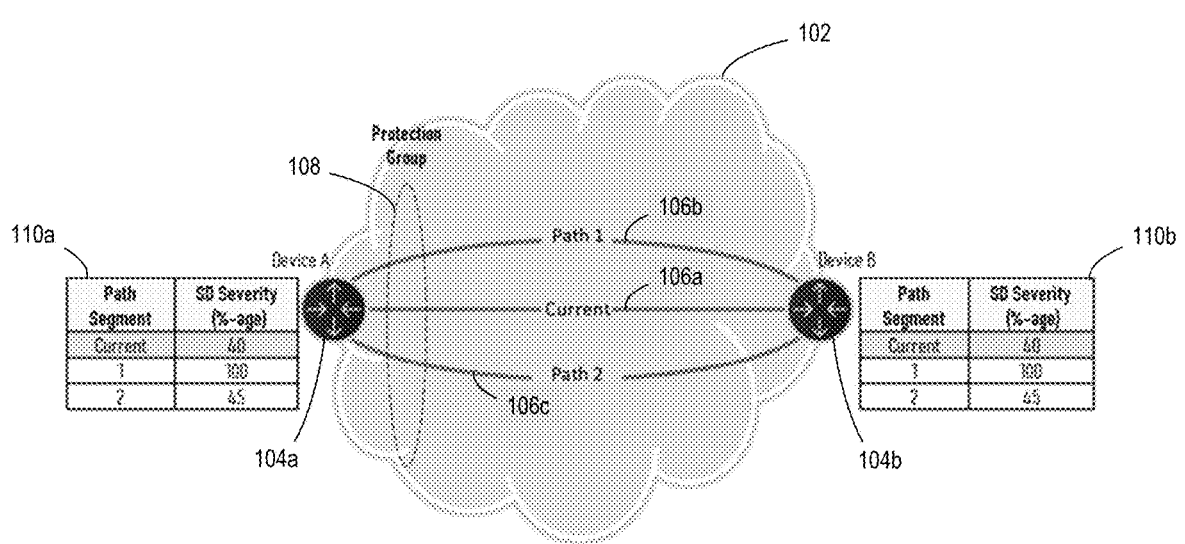
FIG. 1A is a block diagram illustrating an example, non-limiting embodiment of a communication system adapted for relative fault-tolerant switching among degraded redundant communication path in a first operational state and in accordance with various aspects described herein.

The subject disclosure describes, among other things, illustrative embodiments for detecting partial degradation of a current communication path having a first degradation severity rating, comparing the first degradation severity rating to degradation severity ratings of a group of partially degraded alternate communication paths, and selecting one of the alternate communication paths having a degradation severity rating less than the first degradation severity rating. Other embodiments are described in the subject disclosure.

One or more aspects of the subject disclosure include a first communication device, which includes a processing system including a processor and a memory that stores executable instructions. The executable instructions, when executed by the processing system, facilitate performance of operations that include identifying a number of distinguishable communication paths extending between the first communication device and a second communication device, wherein the distinguishable communication paths include a current communication path and a group of alternate communication paths. The current communication path is configured to support a communication session that exchanges information between the first and second communication devices according to a communication service. A first partial degradation is detected of the communication service of the current communication path according to a first degradation severity rating. The operations, responsive to the detecting, further include comparing the first degradation severity rating to a group of alternate degradation severity ratings each corresponding to a respective alternate communication path of the group of alternate communication paths. An alternate communication path of the group of alternate communication paths is selected, for the communication service, having a second degradation severity rating less than the first degradation severity rating.

One or more aspects of the subject disclosure include a non-transitory, machine-readable medium, that includes executable instructions. The executable instructions, when executed by a processing system including a processor, facilitate performance of operations that include identifying a number of distinguishable communication paths extending between the first communication device and a second communication device, wherein the distinguishable communication paths include a current communication path and a group of alternate communication paths. The current communication path is configured to support a communication session that exchanges information between the first and second communication devices according to a communication service. A first partial degradation is detected of the communication service of the current communication path according to a first degradation severity rating. The operations, responsive to the detecting, further include comparing the first degradation severity rating to a group of alternate degradation severity ratings each corresponding to a respective alternate communication path of the group of alternate communication paths. An alternate communication path of the group of alternate communication paths is selected, for the communication service, having a second degradation severity rating less than the first degradation severity rating.

One or more aspects of the subject disclosure include a process that includes identifying, by a processing system including a processor, a number of distinguishable communication paths extending between the first communication device and a second communication device, wherein the distinguishable communication paths include a current communication path and a group of alternate communication paths. According to the process, a current communication path is configured to support a communication session that exchanges information between the first and second communication devices according to a communication service. A first partial degradation is detected of the communication service of the current communication path according to a first degradation severity rating. Further according to the process, and responsive to the detecting, the first degradation severity rating is compared to a group of alternate degradation severity ratings each corresponding to a respective alternate communication path of the group of alternate communication paths. An alternate communication path of the group of alternate communication paths is selected, for the communication service, having a second degradation severity rating less than the first degradation severity rating.

In a context of a communication system, the novel techniques disclosed herein may be adapted to trigger a switchover from one communication path segment to another communication path segment based upon a degraded condition, sometimes referred to as a service and/or signal degradation (SD) condition. Such SD conditions may be associated with a severity rating corresponding to a degree of degradation. In at least some embodiments, SD severity ratings may be obtained according to a monitoring operation, e.g., a reading of a monitored condition or conditions.

In at least some embodiments, a switchover from one communication path segment to another alternate communication path segment is only triggered if the alternate communication path segment is (i) free from an SD condition, i.e., having substantially no degradation according to the monitored parameter(s), i.e., the readings, or (ii) free from a service and/or signal fault (SF) condition. In at least some embodiments, a fault conditions suggests that a corresponding communication path segment is unusable. Accordingly, if an SF condition occurs on an active or current communication path segment, a switchover to some other alternate communication path segment must occur to remedy the failure. Likewise, if one of the alternate communication path segments is identified as having an SF condition, then that alternate communication path segment would not be available to engage in a communication service or signal responsive to a switchover action, such that any switchover to that alternate communication path segment would not occur.

Alternatively, or in addition to the foregoing examples, the novel techniques disclosed herein beneficially identify switchover opportunities that, in at least some embodiments, initiate, trigger and/or otherwise facilitate a switchover from a current degraded communication path segment operating under an SD condition, but not failed according to an SF condition, to some alternative communication path segment. In particular, the switchover of the current degraded path segment may be directed to the alternative communication path segment, which itself may be operating under a degraded SD condition, but not a failed SF condition. In at least some embodiments, such switchover opportunities are identified and/or otherwise initiated, triggered or facilitated when an SD condition of an alternative communication path segment is operating under a second SD condition that is less severely degraded than a primary or current communication path operating under a first SD condition. Beneficially, the switchover may occur even when there is a service/signal degraded condition (on the alternate path), as long as the alternative communication path segment SD condition level is less than that of the current communication path segment SD condition level. In this instance, the switchover would be beneficial if it would result in a communication path operating under a lesser SD condition level. Accordingly, the disclosed techniques enable an SD condition switchover when the switchover transitions communication a partially degraded, current communication path segment over to a "better" or less partially degraded alternative communication path segment.

In at least some embodiments, conditions on the possible alternative or "TO" paths are determined before switching away from a current or "FROM" path. For example, upon detecting a "problem" associated with a current or FROM path, SD conditions, e.g., SD levels, of the alternative TO paths are checked or otherwise evaluated to determine existence and/or severity of any SD and/or SF conditions. Such evaluations of statuses of the TO paths permit selection of a TO path, such as a most favorable TO path, e.g., assuming the TO path is "better" than the FROM path. Such intelligent switchovers are distinguishable from other approaches that otherwise blindly switch a FROM path to a TO path responsive to the FROM path experiencing an SD condition. Beneficially, such informed switchovers permit access to alternative or TO paths that may be experiencing SD conditions, but still pose better alternatives to current or FROM paths having worse SD levels or conditions. Conceptually, a SF (signal fail) condition is also a SD (signal/service degrade) condition. It is just that SF=100% SD, while a clean path is a 0% SD.

A communication path segment may be defined between two communication devices or nodes and adapted for conveying information between the nodes according to a communication service and/or signal. It is understood that in at least some embodiments, a communication path segment may include one path segment between two nodes, without any intervening nodes. Alternatively, or in addition, a communication path segment may include multiple path sub-segments that, in at least some embodiments, may engage one or more interstitial communication devices or nodes, e.g., terminating the path sub-segments and collectively providing the communication path segment. It is envisioned that in at least some embodiments, a current path segment may include the same or similar number and/or type of path sub-segments as one or more of the alternative path segments. For example, all of the path segments of a protection group of path segments may be adapted to operating according to the same communication service, protocol, and the like. Alternatively, or in addition, at least some embodiments, may include path segments of a protection group that differ in one or more aspects, yet remain available to support a switchover. Differences may include, without limitation, operation over different physical media, according to different protocols, operating in different geographical regions, and the like. Differences in physical media may include one or more of fiber-based, coaxial cable-based, twisted copper pair-based, wireless-based, and so on.

In at least some embodiments, one or more nodes of a current and/or alternate communication path segment may implement logic and/or control functionality. Such logic and/or functionality may identify situations in which a switchover is necessary, e.g., in response to an SF condition and/or perhaps an SD condition in which the degradation severity of a current communication path segment has surpassed a severity threshold. To this end, it is envisioned that in at least some embodiments, one or more communication devices and/or nodes that govern a protection group of one or more active or current paths and one or more alternative communication paths of a group of alternate communication paths participating in an SD condition triggered switchover maintain a local record, e.g., a database, of path segments and their corresponding SD severity metrics.

In at least some embodiments, if the active or current communication path segment experiences an SD condition, then the switchover logic or functionality may only select, identify, induce and/or otherwise facilitate a switchover to an alternate communication path segment occur if the SD severity of the current path segment is greater than that of any alternate communication path segment in the protection group. Accordingly, the techniques disclosed herein provide an SD protection hierarchy that is implemented according to relative SD levels of both a primary or current communication segment and one or more backup or alternate communication path segments have elevated SD conditions. An example of an SD protection hierarchy is illustrated in Table 1 below.

TABLE 1

Service/Signal Degrade Protection Hierarchy Example.

| Ref | Primary Fault Status | Back-up Fault Status | Traffic | Action |
|---|---|---|---|---|
| 1 | — | — | Primary | Time zero, traffic on primary, no active faults |
| 2 | SD | — | Backup | SD raise on primary, traffic switch to backup |
| 3 | — | — | Backup | SD clear on primary, traffic stays on backup as DNR |
| 4 | — | SD | Primary | SD raise on backup, traffic switch to primary |
| 5 | SD | SD | Primary | SD raise on primary; traffic stays on primary |
| 6 | SD | SD | Primary | User initiates "manual switchover" to backup. Fails as SD takes priority of manual switch |
| 7 | SD | — | Backup | SD clear on backup, traffic switches to backup |
| 8 | SD | — | Backup | User initiates "manual switchover" to Primary. Fails as SD present on primary. |
| 9 | SD | SD | Backup | SD raise on backup; traffic stays on backup since SD on primary. |
| 10 | SD | SD | Backup | User initiates "manual switchover" to primary. Fails as SD takes priority of manual switch |
| 11 | SD | SF | Primary | Backup goes from SD to SF, traffic switch to primary |
| 12 | SD | — | Backup | SF clears on backup, traffic switch to backup |
| 13 | — | — | Backup | SD clears on primary, traffic stays on backup as DNR |
| 14 | — | — | Primary | User initiates "manual switchover" to primary. |

Rows at reference nos. 5 and 9 of Table 1 show that, according to some implementations of a switchover logic, the level (or intensity) of the SD condition, e.g., a partial SD condition, has no bearing on the switchover logic. In each instance, the currently active path remains unswitched as if the alternate path were in a failed or faulty condition, despite it being at least partially available. Accordingly, if both a primary and backup communication path segments are in a partial SD condition, but (for example) the primary path segment has a severe SD condition (e.g., an SD rating of >80%), and the backup path segment has a mild SD condition (e.g., a SD rating of <20%), no switchover would occur. Such implementations of switchover logic miss switchover opportunities that could improve communication conditions by switching over to a less degraded alternate path. This may be an undesirable situation as it may mis an opportunity to switchover to a "better" communication path, albeit subject to a partial SD condition.

The use of the term "path" in this disclosure is not specific to Multiprotocol label switching (MPLS) label-switched paths (LSPs). A "path" could be a member of a link aggregation group (LAG), a member of an IP based Equal-cost multi-path routing (ECMP) group, and the like.

It is interesting to note that in at least some embodiments, a Signal/Service Fail (SF) condition may be viewed as a 100% severity SD condition, while a fully operative condition may be viewed as a 0% severity SD condition. The example situations illustrated in Table 1 fail to take advantage of partial SD conditions as may be analogized to various shades of grey of SD conditions. The novel disclosure offers improvements over such systems by identifying switchover opportunities for partially degraded conditions based on relative SD conditions.

FIG. 1A is a block diagram illustrating an example, non-limiting embodiment of a fault-tolerant communication system 100 adapted for switching among relative degraded redundant communication paths in accordance with various aspects described herein. The fault-tolerant system 100 is configured for detecting partial degradation of a current communication path having a first degradation severity rating, comparing the first degradation severity rating to degradation severity ratings of a group of partially degraded alternate communication paths, and selecting one of the alternate communication paths having a degradation severity rating less than the first degradation severity rating. The fault-tolerant system 100 includes a communication medium 102 including a first communication device 104a and a second communication device 104b.

The communication medium 102 includes three communication paths 106a, 106b, 106c, generally 106, between the first and second communication devices 104a, 104b. One of the communication paths 106, namely communication path 106a, is configured to support a communication session that exchanges information between the first and second communication devices 104a, 104b according to a communication service.

The other communication paths 106, namely communication paths 106b and 106c of the illustrative example, may be referred to collectively as a group of alternate communication paths that are configurable to support the communication session according to the communication service, but not necessarily engaging in the communication session and/or the communication service. In at least some embodiments, the communication paths 106 may be referred to collectively as a protection group 108 in which one or more of the communication paths 106, referred to as a current path(s) 106a, may be configured to exchange information between the first and second communication device 104a, 104b according to the communication service, while other communication paths 106 of the protection group 108, referred to as an alternate group of communication paths 106b, 106c, remain configurable, but not necessarily configured, for exchange(s) of information between the first and second communication devices 104a, 104b according to the communication service. In at least some embodiments, the alternate group of communication paths 106b, 106c may be referred to as providing a redundant communication capacity.

The communication system 100 is portrayed in a first operational state in which a first communication path 106a serves as a primary or current communication path configured for an exchange of information between the first and second communication devices 104a, 104b, generally 104. The other communication paths 106b and 106c may be referred to as a group of alternate communication paths, which may not engage in an exchange of information between the communication devices 104 unless selected to replace operation of the primary or current communication path, e.g., in response to a fault condition as described further hereinbelow. It is understood that the exchange of information may be unidirectional, e.g., from the first communication device 104a to the second communication device 104b or from the second communication device 104b to the first communication device 104a. Alternatively, or in addition, the exchange of information may be bidirectional. In at least some embodiments, the bidirectional exchange of information may be full duplex in which instance, information may be exchanged in both directions simultaneously over the current communication path 106a. Alternatively, or in addition, the bidirectional exchange of information may be half-duplex, in which instance, information may be exchanged in both directions but not simultaneously. In at least some embodiments, any one or more of the communication paths 106 may be configured to engage in a one-way-only exchange of information, sometimes referred to as simplex communications.

The communication medium 102 may include, without limitation, a wireless communication medium in which the communication paths 106 comprise wireless communication channels. Wireless communication channels may include, without limitation, terrestrial radio communication channels, free space optical communication channels, satellite communication channels, and any combination thereof. Alternatively, or in addition, the communication medium 102 may include a tethered communication medium in which the communication paths 106 comprise tethered communication channels. Tethered communication channels may include electrically conductive channels, such as twisted copper pair, coaxial cable, electrically conductive waveguide, optical channels, such as optical fiber and/or dielectric waveguide, and any combination thereof.

In at least some embodiments, the communication medium 102 comprises at least a portion of a network. Example networks include, without limitation, local area networks, enterprise network, edge networks, and/or wide area networks search as the Internet. At least some of the networks may include packet switched networks in which the communication devices 104a, 104b are adapted to exchange information via data packets. In such instances, the data packets may relate to a communication service, e.g., operating according to a prescribed communication protocol, in which the data packets are forwarded along one hour more of the communication path 106.

According to the example communication medium 102, the communication devices 104a, 104b, generally 104, may represent network elements. The network elements may include, without limitation, network routers, network switches, network gateway servers, add/drop multiplexers, modems, transceivers, repeaters, and so on.

It is understood that an exchange of information over any of the communication paths 106, in relation to the communication service, maybe adversely affected by an operating condition of one or more of the communication devices 106 end/or an operating condition of one or more of the communication paths 106, and/or a condition of the communication medium 102. It is further understood that the communication service may include operational requirements supported by the communication devices 104 and/or the communication paths 106. Operational requirements may include, without limitation, signal level, path loss, service frame-loss ratio, delay, service delay, delay variation, interference, noise, jitter, signal to noise ratio (SNR), error rates, and so on. One or more of the operational requirements may include specified thresholds and/or ranges, as may be required to ensure satisfactory delivery of the communication service. The particular selection of operational requirements and/or thresholds and/or ranges may depend upon a requirement of an application to which the information exchange according to the communication service is supporting. Example applications include, without limitation, voice over IP, streaming media including streaming audio and/or streaming video, electronic messaging, Web browsing, file transfers, gaming, Machine type communications, Internet of Things (IoT), remotely guided vehicles, e.g., drones, autonomously controlled vehicles, e.g., self-driving cars, warehouse automation, virtual reality, augmented reality, and so on. It is understood that some applications will be more sensitive to the operational requirements. For example, a streaming video application may be less tolerable to packet delay and/or jitter than a Web browsing, or file transfer application.

In at least some embodiments, a degradation parameter can be determined for each of the communication paths 106. The degradation parameter generally provides a non-binary indication of an operational condition or performance rating of the communication path 106. Non-binary indications may encompass one or more partially degraded conditions, e.g., a range of conditions according to a resolution or granularity, that may occur between fully operational and failed conditions. It is envisioned that in at least some embodiments, the degradation parameter may include a degradation severity rating that ranges from a first, e.g., a minimum, value indicating substantially no degradation to a second, e.g., a maximum, value indicating substantially total degradation. By way of non-limiting example, a minimum degradation severity rating may indicate that a communication path 106 is supporting and/or capable of supporting a substantially unimpeded and/or substantially uncompromised communication session that exchange of information between communication devices 104 according to a communication service and along the corresponding communication path 106.

Additionally, and by way of non-limiting example, a maximum degradation severity rating may indicate that a communication path 106 has ceased to support and/or is incapable of supporting a communication session that exchange of information between communication devices 104 according to a communication service and along the corresponding communication path 106.

It is envisioned that in at least some embodiments an ability of a communication path to support an exchange of information may be dependent upon a nature and/or specified requirement of an underlying communication service and/or application, e.g., an end-user application. It is also understood that a communication service and/or application may have one or more such specified requirements. For example, a specified requirement may relate to one or more of an SNR condition, an energy per bit to noise ratio, a bit error rate (BER) condition, a packet delay, a jitter value, and the like. Such specified requirements may include target values, e.g., preferred values and/or mean or average values, and/or ranges. Alternatively, or in addition, any specified requirements may include limiting threshold values, such as maxima or minima.

In at least some embodiments, a degradation severity rating may relate to at least one of a number of specified requirements, including, but not limited to, the various examples provided herein. For example, a minimum degradation severity rating may correspond to a communication path satisfying a specified requirement, whereas a maximum degradation severity rating may correspond to an inability of a communication path to satisfy at least some minimum specified requirement. In such instances, a degradation severity rating may represent the measure of such a specified requirement as an indication of a degradation condition.

It is worth noting here that a determination of any such specified requirement may require one or more inspections and/or measurements, which may be accomplished according to any combination of well understood techniques for assessing performance of a communication system, device and/or path segment. For example, one or more operational or performance parameters may be measured at a first end of a communication path 106, or at a second end of the communication path 106, or at both ends of the communication path 106, and/or at some intermediate location along the communication path 106, e.g., at an intermediate node of a routing communication path. Measurements of performance parameters may include measurements performed on exchanged information, e.g., measurements performed using actual data and/or control packets of a packet switched network. Alternatively, or in addition, measurements of performance parameters may be performed using test data, which may be distinguishable from exchanged information of a communication session related to a corresponding communication service or application. At least some examples include an introduction of test data, e.g., test packets, into a packet switched communication system. Performance results of such test packets may be interpreted as representative of the entire communication path and/or any sub-portion or segment thereof and used to determine a degradation condition.

Alternatively, or in addition, a degradation severity rating may be determined according to some combination of one or more measurable quantities based on specified requirements of the communication service and/or the end user application. Such combinations may include linear combinations obtained as weighted sums of two or more measured quantities. Alternatively, or in addition, combinations may include, without limitation, logical combinations, e.g., applying logical operations, such as AND, OR, XOR, NOT and so on to one or more of the measured quantities alone or in combination. By way of example, an overall communication path degradation value may include some weighted combination of two or more measured quantities, with a corresponding degradation being determined according to the weighted combination.

It is understood that in being nonbinary, the degradation parameter may account for one or more measures of degradation occurring between none in total degradation. For example, the degradation parameter may be determined as a percentage value, with 0% degradation indicating no degradation, or operation within specified performance criteria, and 100% degradation, indicating a complete failure, or inability to operate within some minimum specified performance criteria. Other degradation percentages between 0% and 100% may provide a relative measure of degradation, e.g., a gray area between white (0%) and black (100%) degradations that provide some predetermined resolution or granularity.

Once again, the communication system 100 is portrayed in a first operational state in which a first communication path 106a serves as the primary or current path configured for a communication session that exchange information between the first and second communication devices 104 according to a communication service. A first persistent record of degradation severity 110a is accessible to the first communication device 104a. Likewise, a second persistent record of degradation 110b is accessible to the second communication device 104b. The example persistent records of degradation 110a, 110b, generally 110, include a communication path reference and degradation severity values corresponding to each of the communication paths 106 of the example protection group 108. In at least some embodiments, an active or current path may be distinguished from the alternate communication paths of the protection group 108, e.g., to facilitate comparisons of degradation severity values as may be performed according to a fault-tolerant, e.g., communication path switchover process.

The first and second persistent records of degradation severity 110 may be determined independently, e.g., by each of the first and second communication devices 104. In at least some embodiments, the degradation severity ratings provided within the persistent records of degradation severity 110 may correspond to a directionality of the communication path 106. For example, degradation severity ratings provided by the first persistent record of degradation severity 110a may represent a degradation severity rating of the communication exchange originating at the first communication device, i.e., the proximate communication device 104a, or degradation severity rating of the communication exchange originating from the second communication device, i.e., the distal or remote communication device 104b. Alternatively, or in addition, the degradation severity rating of either persistent record of degradation severity 110 may correspond to a bidirectional aspect of the corresponding communication path 106.

Without limitation, the degradation severity ratings may be determined locally at one of the communication devices 104, remotely at one or more of the remote communication devices 104, and/or at one or more other devices remote to either of the first and second communication devices 104. In at least some embodiments, the persistent records of degradation severity 110 may be maintained locally with respect to one or more of the communication devices 104 relating to the communication path 106 of the protection group 108, e.g., stored in a local memory or register. Alternatively, or in addition, at least some of the degradation severity ratings of the persistent records of degradation severity 110 may be maintained remotely and made accessible to a fault-tolerant processor or switchover device implementing any of the novel switchover techniques disclosed herein. For example, at least some of the degradation severity ratings of the persistent records of degradation severity 110 may be retained within a network accessible storage device, e.g., a network storage array, a cloud storage system and/or a database server.

The degradation severity ratings of the persistent records of degradation severity 110 may be updated to reflect a substantially current or at least recent status of the corresponding communication path 106. To this end it is envisioned that in at least some embodiments the degradation severity ratings may be updated periodically. For example, the communication paths 106 may be monitored periodically according to a schedule. Schedules may include, without limitation, a periodic schedule in which measurements are performed according to a measurement period, which may be reflected in milliseconds, seconds, minutes, hours, and so on. Alternatively, or in addition, schedules may be determined according to one or more events. Events may include, without limitation, in exchange of a predetermined number of packets, and/or a predetermined amount of data. It is understood that any such monitoring schedule may depend at least in part on a type of communication session, a type of communication service, a predetermined priority, and/or a type of application.

In a packet switched network, computed paths may be validated periodically, e.g., every few seconds (30 secs). In at least some instances, such validations may identify whether a better path might exist for a packet exchange. If so, then a reconfiguration, e.g., of label-switched paths (LSPs) may be triggered, e.g., by a protocol, such as multiprotocol label switching (MPLS), towards a goal of re-optimization. In at least some embodiments, the techniques disclosed herein may perform similar monitoring and reconfigurations under a signal degradation (SD) constraint.

It is appreciated that any monitoring and reconfigurations based on SD condition may, in at least some embodiments, result in a large number of and/or frequent reconfigurations. The performance characteristics used to define SD of each communication path segment may be measured persistently. In at least some embodiments, the measurement window, interval and/or event may adjustable, e.g., being user defined. In at least some embodiments one or more features may be provided to avoid excessive and/or unproductive switching, reconfiguring, or churning. For example, an SD threshold may be identified for one or more of the paths, such as the active or current path. In such instances, reconfiguring to an alternate path might only occur if the primary path SD value falls below some minimum SD threshold. If the existing "path" SD condition is met, i.e., the performance is no longer within tolerance, then a "path" whose performance is within tolerance is selected. Alternatively, or in addition, the SD threshold may include an SD difference threshold, such that a reconfiguration to an alternate path might only occur if a difference between SD values of the primary and alternate paths exceeds some SD difference threshold. Should an SD condition exceed a certain threshold (once again user defined), then the next "path" that meets that "threshold" is selected. Alternatively, or in addition, other constraints may be imposed to prevent frequent or excessive reconfigurations, such as a time delay that may be imposed after a reconfiguration before a next reconfiguration may occur. Any of the foregoing may be provided alone or in combination, e.g., adjusting SD thresholds, SD difference thresholds according to time delay values. It is understood that any of the thresholds, time delay values, and the like, may be determined by a network operator, a communication service requirement, an end-user application requirement, a user preference, and so on.

The illustrative fault-tolerant communication system of FIG. 1A is illustrated as being a first state captured at least in part according to entry values of the first and second persistent records of degradation severity 110a, 110b. In this example, both persistent records of degradation severity 110a, 110b contain identical entries. It is understood that in at least some embodiments, the entries of the persistent records of degradation severity 110a, 110b may differ, e.g., signifying different conditions as may be associated with information exchanges occurring in different directions along the same communication path segments. According to the illustrative example, the current communication path segment 106a has a degradation severity rating of 40%, e.g., indicating 40% degradation according to some predetermined monitoring scheme, which may be based on one or more monitored parameters and/or combinations of monitored parameters. The first alternate communication path segment 106b has a degradation severity rating of 100%, while the second alternate communication path segment 106c has a degradation severity rating of 45%. Here, the first alternate communication path segment 106b is not partially degraded, but rather totally degraded or faulty and thus unavailable for a switchover, or perhaps unavailable for even a consideration as a switchover alternative. Accordingly, an embodiment of switchover logic or functionality may not consider the first alternate communication path segment 106b as being available as a candidate for switchover. The second alternate communication path segment 106c is partially degraded at 45% but may not be selected as a suitable candidate for switchover because its degradation severity rating is greater than that of the current communication path segment 106a, i.e., 45%>40%.

Figure 1B:
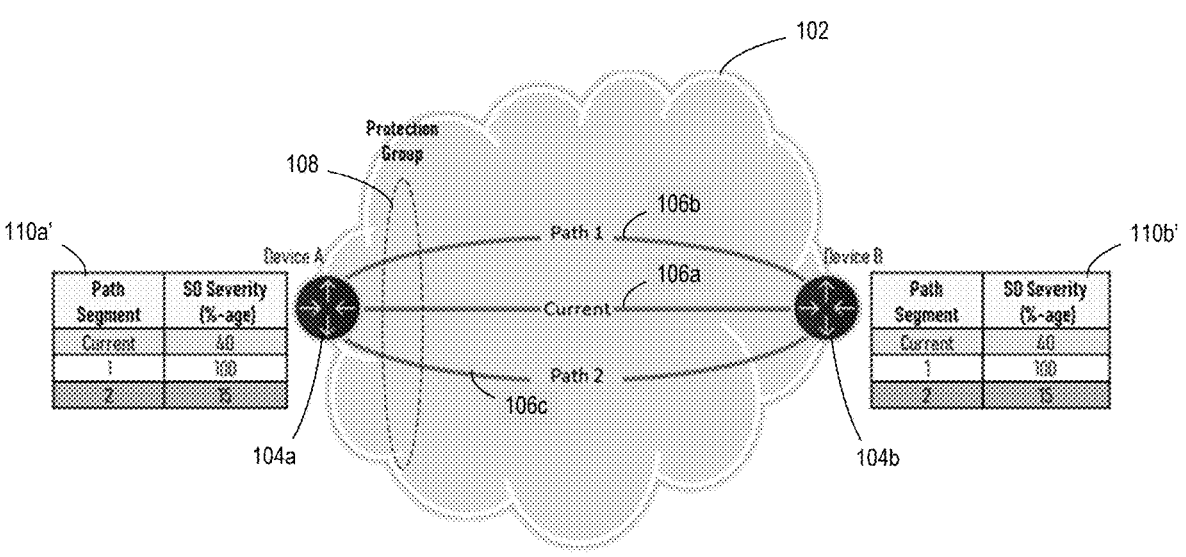
FIG. 1B is a block diagram illustrating an example, non-limiting embodiment of the communication system of FIG. 1A in another state and in accordance with various aspects described herein.

FIG. 1B is a block diagram illustrating an example, non-limiting embodiment of the fault-tolerant communication system 150 corresponding to the fault-tolerant communication system 100 of FIG. 1A in a second state and in accordance with various aspects described herein. According to the second state, as captured at least in part in entry values of the first and second persistent records of degradation severity 110a', 110b', the current communication path segment 106a, once again, has a degradation severity rating of 40%, e.g., indicating 40% degradation to some predetermined monitoring scheme. As in the first state, the first alternate communication path segment 106b has a degradation severity rating of 100%, while the second alternate communication path segment 106c now has a substantially lesser degradation severity rating of 15%. Here, the first alternate communication path segment 106b is not partially degraded, but rather totally degraded or faulty. Accordingly, an embodiment of switchover logic or functionality may not consider the first alternate communication path segment 106b as being available as a candidate for switchover. The second alternate communication path segment 106c is partially degraded and may be considered as being available as a candidate for switchover because its degradation severity rating of 15% is less than that of the current communication path segment 106a, i.e., 15%<40%.

Figure 2:
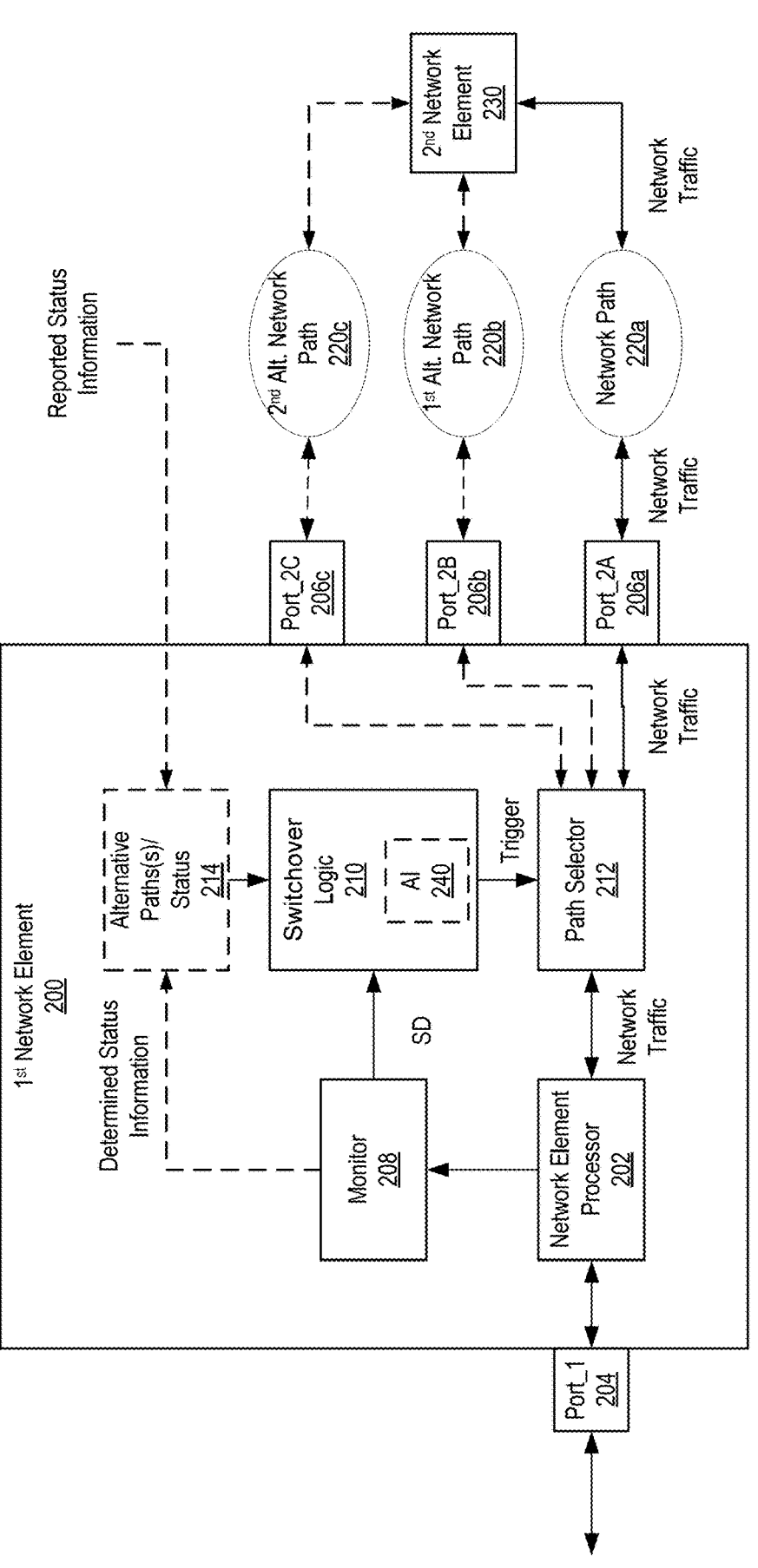
FIG. 2 is a block diagram illustrating an example, non-limiting embodiment of a network element adapted for relative fault-tolerant switching among degraded redundant communication path in accordance with various aspects described herein.

FIG. 2 is a block diagram illustrating, in more detail, an example, non-limiting embodiment of a first network element 200 adapted for relative fault-tolerant switching among degraded redundant communication path segments in accordance with various aspects described herein. In at least some embodiments, the first network element 200 is configured for detecting partial degradation of a current communication path segment having a first degradation severity rating, comparing the first degradation severity rating to degradation severity ratings of a group of partially degraded alternate communication path segments, and selecting one of the alternate communication path segments having a degradation severity rating less than the first degradation severity rating.

The example first network element 200 includes a network element processor 202, a communication path segment evaluator or monitor 208, a switchover logic module 210 and a communication path segment selector 212. The network element processor 202 is in communication with a first communication port 204 of the first network element 200. The network element processor 202 is also in communication with the path selector 212, which is in further communication with a group of second communication ports 206a, 206b, 206c, generally 206. Each second communication port 206 is in communication with a respective one of a group of communication path segments 220a, 220b, 220c, e.g., of a protection group 108 (FIG. 1A).

The first network element 200 is in communication with a second network element 230 via at least one of the group of communication path segments 220, which may be referred to as an active or current communication path segment. Others of the group of communication path segments 220 may be available as alternate communication path segments as may engaged and/or otherwise activated responsive to a switchover event. In operation, the network element processor 202 may process a communication session that exchanges information between the first and second network elements 200, 230. By way of example, the network element processor 202 operates within a communication system includes a packet switching network, in which it performs functions related to processing packets of a communication session. In at least some embodiments, the monitor 208 may receive information from the network element processor 202 that allows the monitor 208 to determine one or more conditions of the communication path segment. For example, the monitor 208 may determine a degradation severity rating of performance of the active or current communication path segment.

In at least some embodiments, the monitor 208 provides an indication of the degradation severity rating of the active or current communication path segment to the switchover logic module 210. The switchover logic module 210 may implement switchover logic and/or functionality according to information, such as the degradation severity rating received from the monitor 208. The switchover logic module 210 also obtains indications of degradation severity ratings of other communication path segments of the protection group, such that the switchover logic module 210 may implement a logic and/or functionality to identify a switchover opportunity and/or to initiate, trigger and/or otherwise facilitate a switchover from the active or current communication path segment having a first partial degradation severity rating to an alternate communication path segment having a second partial degradation severity rating. According to the illustrative example, the first network element 200 may include a local storage element 214 (shown in phantom) adapted to locally store records of degradation severity ratings of alternative communication path segments of the protection group. In at least some embodiments, the local storage element 214 periodically receives updated indications of the degradation severity ratings of the alternative communication path segments to retain a persistent record of the degradation severity ratings of the communication path segments of the protection group.

In at least some embodiments, the switchover logic module 210 may include and/or otherwise have access to a machine learning feature, e.g., an artificial intelligence (AI) module 240 (shown in phantom). The AI module 240 may implement a machine learning algorithm adapted to facilitate a switchover recommendation as may be identified and/or otherwise implemented by the switchover logic module 210. The AI module 240 may be trained according to an appropriate set of training data adapted towards the switchover applications disclosed herein. Alternatively, or in addition, the AI module 240 may be periodically retrained and/or otherwise updated to improve and/or otherwise enhance support of the switchover applications disclosed here in.

Figure 3:
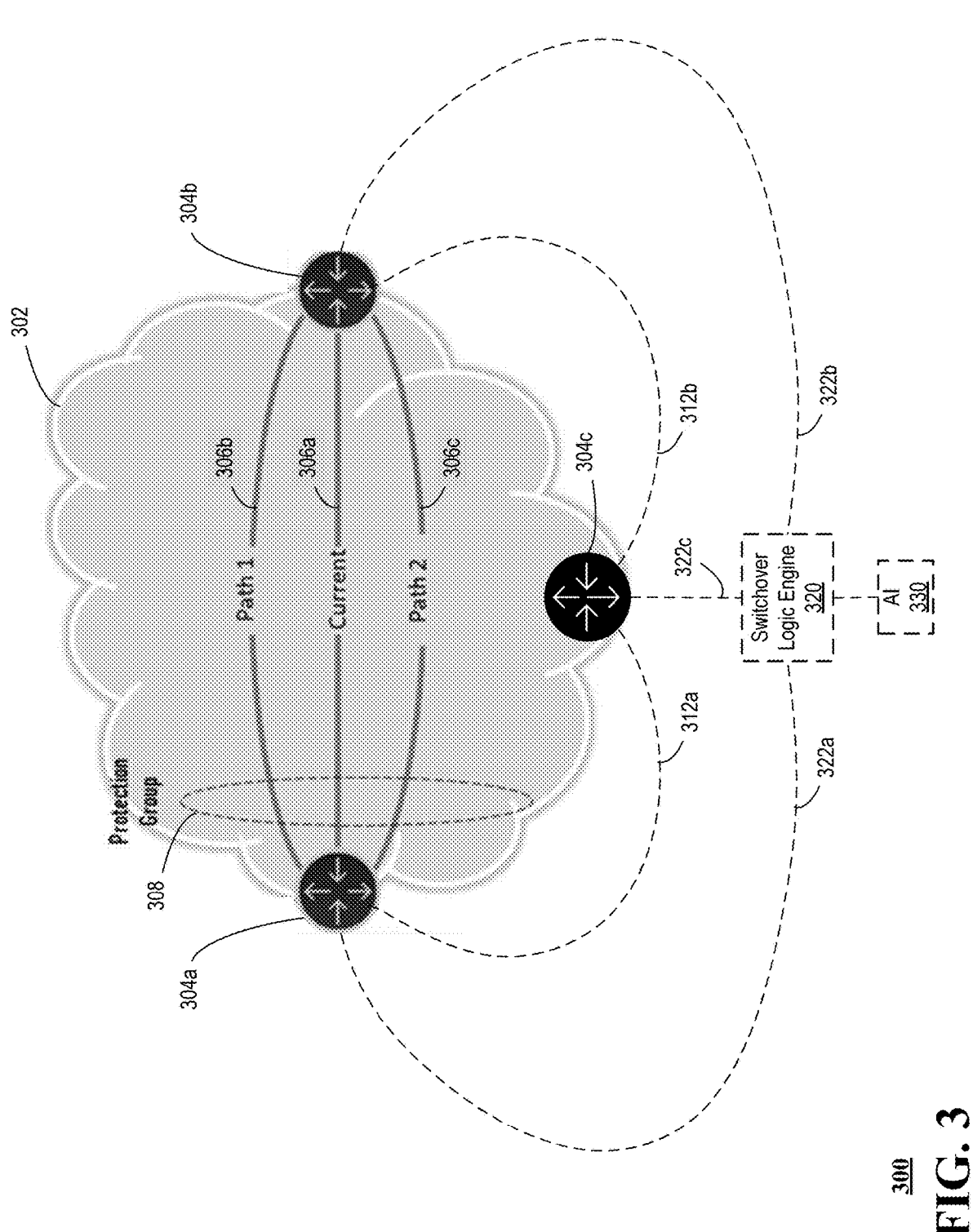
FIG. 3 is a block diagram illustrating an example, non-limiting embodiment of another communication system adapted for relative fault-tolerant switching among degraded redundant communication path in a first operational state and in accordance with various aspects described herein.

FIG. 3 is a block diagram illustrating an example, non-limiting embodiment of another communication system 300 adapted for relative fault-tolerant switching among degraded redundant communication path segments in a first operational state and in accordance with various aspects described herein. In at least some embodiments, the communication system 300 is configured for detecting partial degradation of a current communication path segment having a first degradation severity rating, comparing the first degradation severity rating to degradation severity ratings of a group of partially degraded alternate communication path segments, and selecting one of the alternate communication path segments having a degradation severity rating less than the first degradation severity rating.

The example communication system 300 includes first and second communication devices 304a, 304a, generally 304. The communication system 300 also includes a protection group 308, which includes an active or current communication path segment 306a, a first alternate communication path segment 306b and a second alternate communication path segment 306c operating within a communication medium 302, e.g., a network environment. The active or current communication path segment 306a is configured to support a communication service that exchanges data between the first and second communication devices 304. The first and second alternate communication path segments 304 are provisioned, provided, configured and/or otherwise identified to assume operation of the communication service in the event of a switchover action according to the various techniques disclosed herein.

In at least some embodiments, the switchover action is determined responsive to implementation of a switchover logic and/or switchover functionality that may be adapted to compare relative degradation severity ratings of the active or current communication path segment 306a to degradation severity ratings of one or more alternate communication path segments 306b, 306c of the protection group 308. A switchover may be determined based on such a comparison, e.g., preferring to transition a partially degraded communication service from the active or current communication path segment 304a to a partially degraded alternative communication path segment 304b, or 306c having a lesser degradation severity rating then the active or current communication path segment 306a.

In at least some embodiments the example communication system 300 includes one or more other communication devices 304c that may be the same, similar or distinguishably different from the first and second communication devices 304a, 304b. It is envisioned that a switchover logic and/or control process may performing part or all of the functionality to identify and/or otherwise initiate, trigger, and/or facilitate the aforementioned switchover may be performed the first communication device 304a, the second communication device 304b, the third communication device 304c, or any combination thereof.

In at least some embodiments, the communication system 300 may include at least one remote and/or otherwise centralized switchover logic engine 320 (shown in phantom). It is envisioned that the switchover logic engine 320 may perform part or all of the functionality to identify and/or otherwise initiate, trigger, and/or facilitate the aforementioned switchover, alone or in combination with one or more of the communication devices 304. To this end, it is envisioned that one or more of the first and second communication devices 304a, 304b may be in communication with the third communication device 304c via a communication path 312a, 312b (shown in phantom). Likewise, one or more of the first and second communication devices 304a, 304b may be in communication with the switchover logic engine 320 via a communication path 322a, 322b, 322c (also shown in phantom).

Figure 4A:
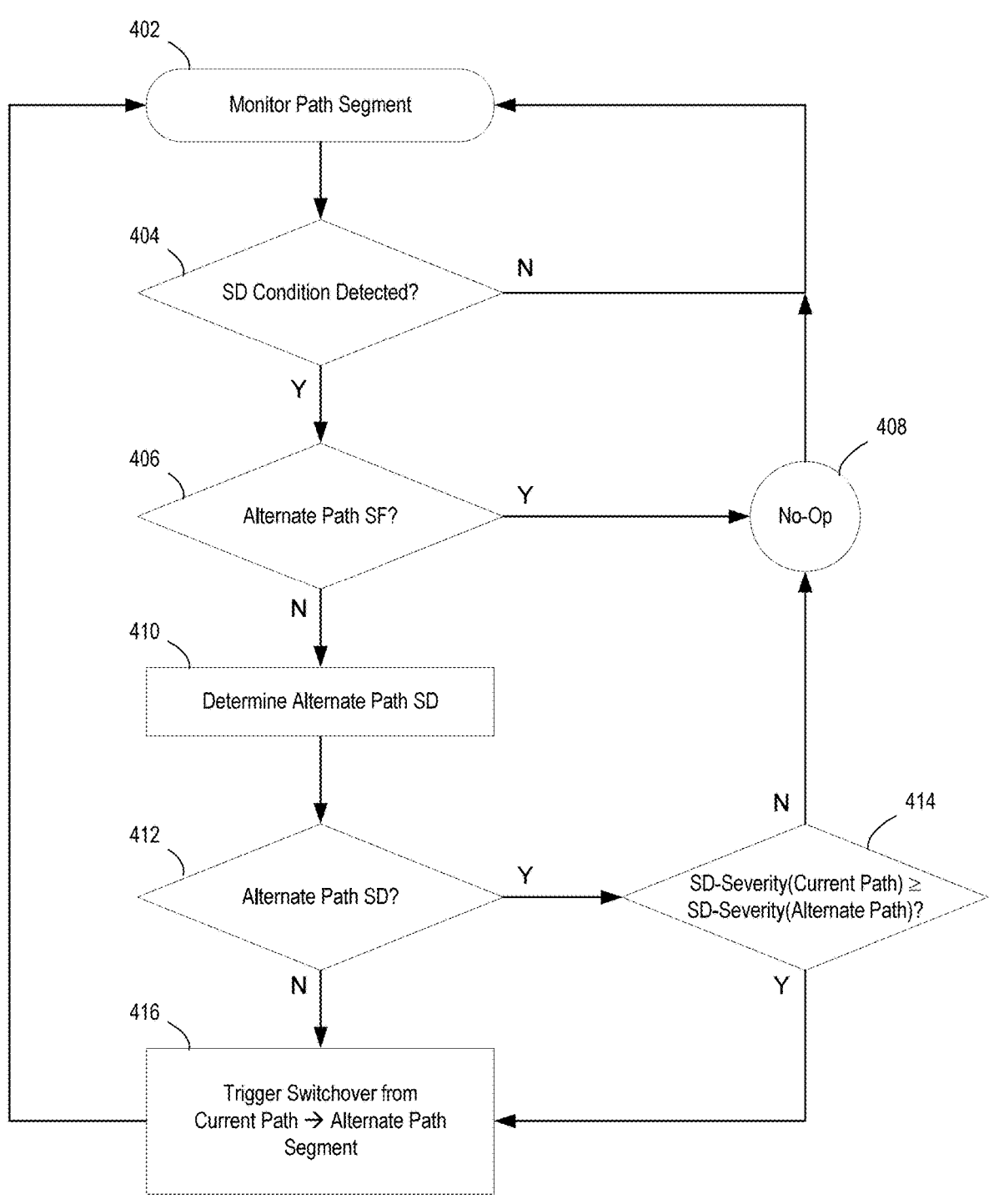
FIG. 4A depicts an illustrative embodiment of a process adapted for relative fault-tolerant switching among degraded redundant communication path in accordance with various aspects described herein.

FIG. 4A depicts an illustrative embodiment of a fault-tolerant process 400 adapted for relative fault-tolerant switching among degraded redundant communication path segments in accordance with various aspects described herein. In at least some embodiments, the fault-tolerant process 400 is configured for detecting partial degradation of a current communication path segment having a first degradation severity rating, comparing the first degradation severity rating to degradation severity ratings of a group of partially degraded alternate communication path segments, and selecting one of the alternate communication path segments having a degradation severity rating less than the first degradation severity rating.

According to the example fault-tolerant process 400, a condition of an active or current communication path segment is monitored at 402. It is understood that a type and/or frequency of monitoring may depend upon one or more of a type and/or requirement of a communication session of the active or current communication path, a type, requirement and/or quantity of data exchanged via the active or current communication path segment, a type and/or requirement of the communication service and/or a type and/or requirement of a corresponding end-user application. It is further understood that the monitoring may include any of the example monitoring techniques disclosed herein, including, but not limited to, inspection of exchanged user data and/or control data, including one or more of data rate, packet delay, jitter, noise, error rates, and so on.

According to the example process 400, a signal or service degradation condition may be detected at 404. In at least some embodiments, the signal or service degradation condition may be associated with a degradation severity rating, e.g., a numeric value such as a percentage or rating according to some other non-binary or multiply graded scale of degradation. In at least some embodiments, the signal or service degradation condition may be determined according to monitored information obtained at 402. In at least some embodiments the degradation condition may be detected according to a single monitored parameter of the monitored communication path segment. Alternatively, or in addition, the degradation condition may be detected according to more than one monitored parameter of the monitored communication path segment. It is envisioned that the degradation condition may be determined according to a combination of monitored parameters of the monitored communication path segment. Such combinations may include linear weighted combinations, algebraic combinations, e.g., mean-squared combinations, and the like. In at least some embodiments, the signal or service degradation condition may be determined according to a Boolean expressions based on one or more of the monitored parameters. In at least some embodiments the Boolean expressions may be based on weighted monitored parameters. It is envisioned that the monitoring may be performed in whole or in part by one or more communication devices of the communication path segment, e.g., the endpoint devices, another communication device of the path segment or otherwise, a remote or centralized monitoring device or service, or any combination thereof.

To the extent the it is determined that the signal or service degradation of the active or current path segment is not detected at 404, the process 400 continues to monitor a condition of the active or current communication path segment at 402. In at least some embodiments, detection of a service degradation condition may be based in whole or in part upon a threshold value. For example, the aforementioned monitored parameters and/or any of the various combinations of the monitored parameters used to determine a signal or service degradation may be compared to a threshold value. However, to the extent that a signal or service degradation condition of the active or current communication path segment is detected at 404, the process 400 continues to determine at 406 whether a fault condition is associated with an alternate communication path segment of the group of alternate communication path segments under consideration for a possible switchover. In at least some embodiments the alternate communication path segments include other communication path segments of a protection group as may be associated with the active or current communication path segment.

It is worth noting here that in at least some embodiments an active or current communication path segment may represent a preferred communication path and thus be distinguishable from the alternate communication path segments of the protection group. Accordingly, should a switchover be implemented to one or more of the alternate communication path segments, the preferred communication path segment would remain identifiable, thereby allowing a return switchover to the preferred communication path at some future time, e.g., when signal or service conditions and/or remedy of any related fault conditions so allow.

To the extent the it is determined at 406 that a fault condition is associated with the alternate communication path segment under consideration, the process 400 determines that no switchover operation is available for the faulty alternate communication path segment under consideration at 408 due to its faulty condition. Accordingly, the exchange of information over the active or current communication path segment may continue using the same active or current communication path segment, despite there being a degraded condition. The process 400 then continues to monitor an updated, e.g., current condition of the communication path segment at 402. However, to the extent it is determined at 406 that the alternate communication path segment under consideration is not faulty, the process 400 continues to determine at 410 a signal or service degradation associated with the alternate communication path segment under consideration for a possible switchover. In some embodiments, evaluation of the alternate communication path segment to determine whether a signal of service degradation condition is detected at 404 considers more than one alternate communication path segment of the group of alternate communication path segments, e.g., being determined sequentially and/or in some parallel fashion.

To the extent it is determined at 410 that the alternate communication path segment under consideration is not faulty, the process 400 determines that no switchover operation is applicable for the faulty alternate communication path segment under consideration at 408. The process 400 then continues to monitor an updated, e.g., current condition of the communication path segment at 402. However, to the extent it is determined at 406 that the alternate communication path segment under consideration is not faulty, a determination of a signal or service degradation condition of the alternate path segment under consideration is obtained at 410. The signal or service degradation condition of the alternate path segment may be obtained by monitoring and/or measurements such as those described above for the active or current communication path segment. For example, signal or service degradation condition of the alternate paths segment may be obtained by the communication devices associated with the protection group, by some other communication device(s), by some remote or centralized monitoring device or service, or any combination thereof. In at least some embodiments the signal or service degradation condition of the alternate communication path segment may be provided to the communication device or devices or centralized processor or service for evaluation according to the example process 400. For example, the signal or service degradation conditions of the alternate communication path segments may be retained locally according to a degradation status record, or table, or database, or the like. Such local retention of degraded conditions would facilitate an efficient implementation of the example process 400 allowing switchovers to occur with minimal impact to exchanges of data Via the protection group.

According to the example process 400, a determination is made 412 as to whether the alternate communication path segment under consideration has an associated signal or service degradation condition obtained at 410. Once again, any of the signal or service degradation conditions disclosed herein may have an associated degradation severity rating. To the extent it is determined at 412 that the alternate communication path segment under consideration has and associated signal or degradation condition, the process 400, at 414, compares a degradation severity rating of the active or current communication path segment to a degradation severity rating of the alternate communication path segment under consideration. Depending upon a degradation scale, the degradation values may be positive, negative zero, whole numbers, fractions, percentages, and the like. Alternatively, or in addition, the degradation severity ratings may be associated with some other relative indicator, such as a color, e.g., red, yellow green, a shade of gray, a graphical value, e.g., according to a graph, such as a bar graph, and the like.

To the extent it is determined at 414 that the degradation severity of the active or current path is less than the degradation severity rating of the alternate path under consideration, the process 400 determines at 408 that no switchover operation is necessary for the active or current communication path segment in view of the relative difference of degradation severity ratings determined at 414. Accordingly, the exchange of information over the active or current communication path segment may continue using the same active or current communication path segment, despite there being a degraded condition. The process 400 then continues to monitor an updated, e.g., current condition of the communication path segment at 402. To the extent it is determined at 414 that the degradation severity rating of the active or current path is not less than the degradation severity rating of the alternate path under consideration, the process 400, at 416, initiate, orchestrates, triggers, and/or otherwise facilitates a switchover from the active or current communication path segment to the alternate communication path segment under consideration.

In some embodiments, the process 400 is performed for more than one alternative communication path segment of a protection group. For example, the process may be performed for a first alternate communication path segment of the protection group. The process 400 may then be repeated for one or more other alternate communication path segments of the protection group. In at least some embodiments the process 400 may be performed and/or otherwise repeated until a switchover event is triggered. Alternatively, or in addition, the process 400 may evaluate degradation severity ratings for multiple and up to all alternate communication path segments of a protection group before initiating a switchover at 416. In this manner, the process 400 may facilitate selection of that alternate communication path of the protection group having the least degradation severity rating. In at least some embodiments, at least some steps of the process 400 may be repeated sequentially according to different alternate communication path segments of the protection group.

Figure 4B:
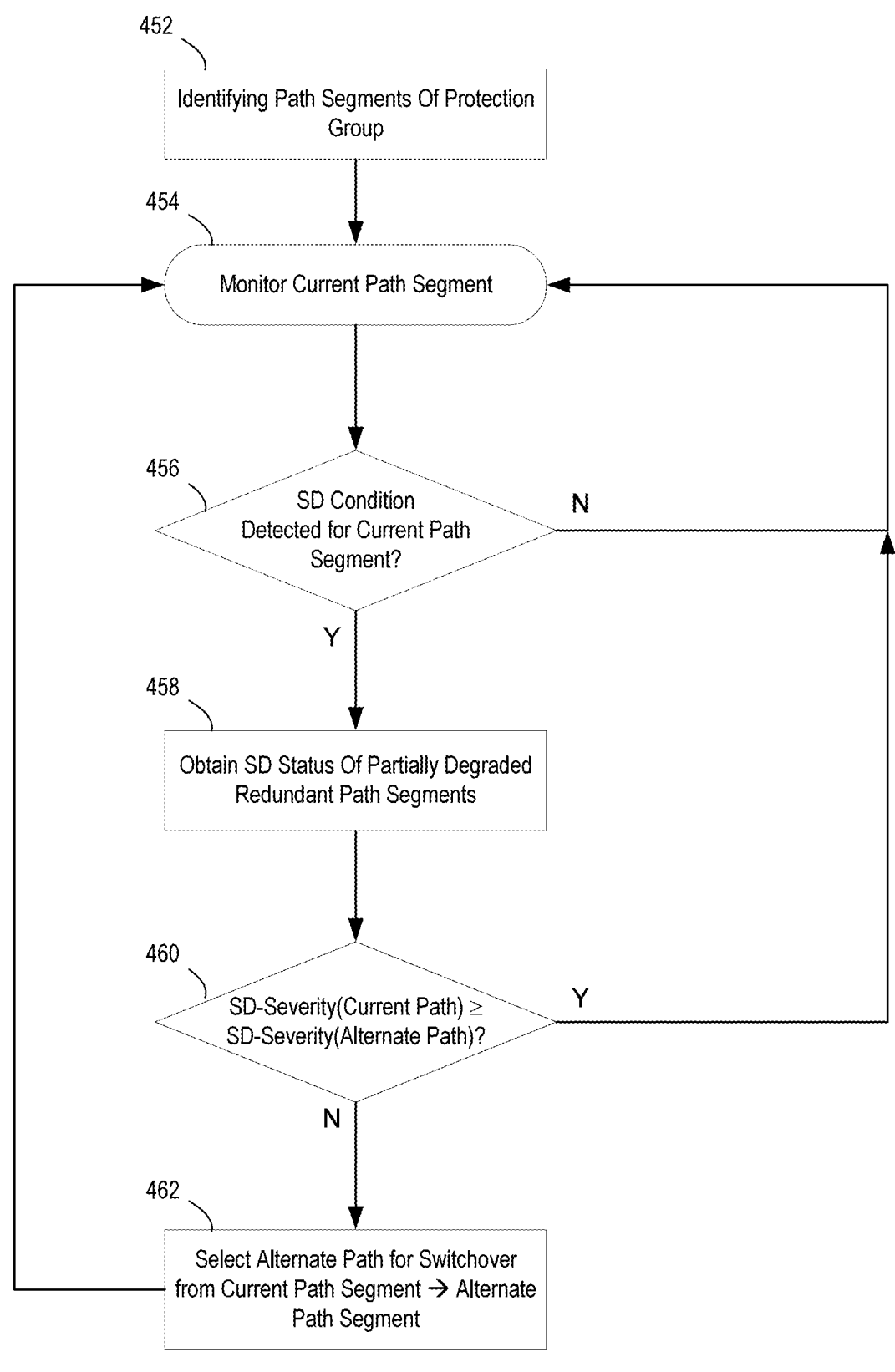
FIG. 4B depicts an illustrative embodiment of another process adapted for relative fault-tolerant switching among degraded redundant communication path in accordance with various aspects described herein.

FIG. 4B depicts an illustrative embodiment of another fault-tolerant process 450 adapted for relative fault-tolerant switching among degraded redundant communication path in accordance with various aspects described herein. In at least some embodiments, the fault-tolerant process 450 is configured for detecting partial degradation of a current communication path having a first degradation severity rating, comparing the first degradation severity rating to degradation severity ratings of a group of partially degraded alternate communication paths, and selecting one of the alternate communication paths having a degradation severity rating less than the first degradation severity rating.

According to the illustrative embodiment of the fault-tolerant process 450, communication path segments of a protection group are identified at 452. In at least some embodiments, communication path segments of the protection group represent redundant communication path segments, e.g., allowing for a communication session that exchanges data between communication devices over any one or more of the communication path segments of the protection group. It is understood that the communication path segment may be independent, e.g., providing alternative routes via a communication medium. Alternatively, or in addition, at least a portion of at least some communication path segments of the protection group may share at least some communication resources, e.g., network path segments that may include one or more common sub segments or nodes.

According to the illustrative fault-tolerant process 450, an active or current communication path segment may be monitored at 454. A determination may be made at 456 as to whether there exists a degradation severity rating for the active or current communication path segment. To the extent it is determined at 456 that there exists no degradation severity, which may include a degradation severity rating of "0," the process 450 resumes to monitoring the active or current path segment at 454. However, to the extent it is determined at 456 that the active or current communication path segment has a degradation severity rating, e.g., a nonzero value, the process continues to obtain, at 458, degradation severity ratings of one or more partially degraded path segments of the protection group.

As used herein, the term partially degraded in reference to degradation severity of a communication path segment indicates that the communication path segment has an associated signal or service degradation that, in reference to a percentage degradation severity rating, is neither 0% indicating no degradation and 100% indicating total degradation, failure or fault. Search non-binary degradation rating values allow for a determination of degradation along a non-binary scale. An example of a binary scale may include two values, one indicating no degradation and another indicating complete degradation, fault or failure.

According to the illustrative process 450, a determination is made at 460 as to whether the degradation severity rating of the current path is greater than or equal to the degradation severity rating of an alternative path of the protection group. To the extent it is determined at 460 that the degradation severity rating of the current path is greater than or equal to the degradation severity rating of the alternative path, the process 450 continues monitoring the active or current path segment at 454. However, if it is determined at 460 that the degradation severity rating of the current path is less than the degradation severity rating of the alternate path the process 450, at 462, selects the alternate communication path segment compared in the preceding set for switchover from the active or current communication path segment to the alternate communication path segment.

While, for purposes of simplicity of explanation, the respective processes 400, 450 are shown and described as a series of blocks in FIGS. 4A and 4B it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In at least some embodiments the switchover logic and/or functionality may be implemented according to current and/or recently monitored conditions. Alternatively, or in addition, the switchover logic and/or functionality may be implemented at least in part according to persistent degradation severity ratings. It is envisioned that in at least some embodiments switchover logic and/or functionality may be implemented at least in part according to prior or past monitored conditions and/or prior or past degradation severity ratings. For example, a switchover opportunity may be identified based on relative degradation severity ratings, e.g., when a relative difference exceeds some threshold value. However, any triggering of a switchover event maybe further based on past performance and/or any predictions of current or future performance. Historical records of past performance may suggest that in alternate communication path having a relatively superior partial degradation rating may not serve as a suitable candidate for switchover based on past performance or predictions of future performance suggesting the degradation rating maybe unreliable or subject to worsening.

Referring again FIG. 3, the illustrative communication system 300 may include a machine learning capacity, such as the example artificial intelligence (AI) module 330 (Shown in phantom). The example AI module 330 may be in communication with the switchover logic engine 320 and/or one or more of the communication devices 304, and/or any other device that may contribute to the formulation of the switchover recommendation. By way of example, the AI module 330 may be adapted to predict a reliability of a degradation severity rating of one or more of the communication paths of a protection group. To the extent a reliability is attributed to any degradation severity rating, the reliability may be considered, e.g., by a switchover logic and/or functionality module, alone or in combination with the degradation severity rating to obtain a switchover decision. Alternatively, or in addition, the AI module 330 may determine a degradation severity rating based upon monitored conditions in view of other factors. Examples of other factors may include past performance according to the monitored conditions, conditions of a communication medium that may include noise, congestion, and the like. In at least some embodiments, the AI module 330 may obtain inputs from other sources such as operation and maintenance records, schedule, time of daytime, busy hour records and so on.

Figure 5:
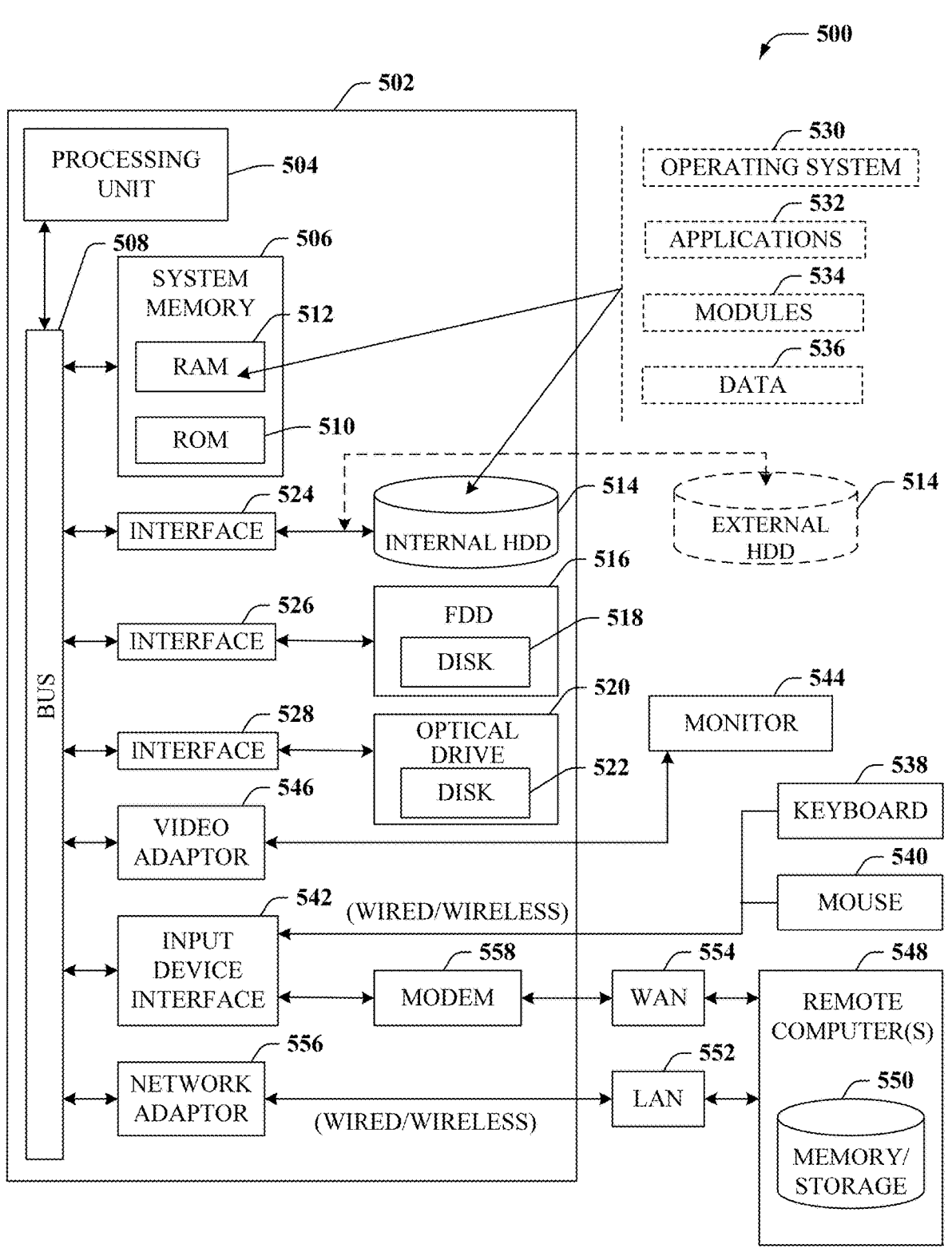
FIG. 5 is a block diagram of an example, non-limiting embodiment of a computing environment in accordance with various aspects described herein.

Turning now to FIG. 5, there is illustrated a block diagram of a computing environment in accordance with various aspects described herein. In order to provide additional context for various embodiments of the embodiments described herein, FIG. 5 and the following discussion are intended to provide a brief, general description of a suitable computing environment 500 in which the various embodiments of the subject disclosure can be implemented. For example, computing environment 500 can facilitate in whole or in part detecting partial degradation of a current communication path having a first degradation severity rating, comparing the first degradation severity rating to degradation severity ratings of a group of partially degraded alternate communication paths, and selecting one of the alternate communication paths having a degradation severity rating less than the first degradation severity rating.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couples system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high-capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are examples and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

Moreover, it will be noted that the disclosed subject matter can be practiced with various computer system configurations, comprising single-processor or multiprocessor computer systems, mini-computing devices, mainframe computers, as well as personal computers, hand-held computing devices (e.g., PDA, phone, smartphone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be in both local and remote memory storage devices.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass semiconductor devices, wafers, integrated circuits, circuit modules, modules, systems and/or components incorporating semiconductor devices, as well as a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "example" are used herein to mean serving as an instance or illustration. Any embodiment or design described herein as "example" or "example" is not necessarily to be construed as preferred or advantageous over other embodiments or designs. Rather, use of the word example or example is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying a plurality of communication paths extending between a first communication device and a second communication device, wherein the plurality of communication paths comprises a current communication path and a group of alternate communication paths, the current communication path configured to support a communication session that exchanges information between the first and second communication devices according to a communication service;
detecting a first partial degradation of the communication service of the current communication path according to a first degradation severity rating;
responsive to the detecting:
comparing the first degradation severity rating to each degradation severity rating of a plurality of degradation severity ratings corresponding to a respective alternate communication path of the group of alternate communication paths;
determining a switchover opportunity based on a degradation severity difference between the first degradation severity rating and a second degradation severity rating of the plurality of degradation severity ratings; and
selecting, responsive to the switchover opportunity, an alternate communication path of the group of alternate communication paths, for the communication service, having a second degradation severity rating less than the first degradation severity rating, wherein the selecting the alternate communication path is responsive to detecting the degradation severity difference exceeding a degradation severity rating difference threshold.

2. The device of claim 1, wherein the operations further comprise:
triggering a reconfiguration of the communication session to obtain a reconfigured communication session that exchanges information between the first and second communication devices via the alternate communication path according to the communication service.

3. The device of claim 2, wherein the triggering the reconfiguration of the communication session further comprises:
sending, by the processing system, a reconfiguration message to at least one of the first and second communication devices to facilitate a reconfiguration of the communication session that exchanges information between the first and second communication devices via the alternate communication path according to the communication service.

4. The device of claim 1, wherein the first degradation severity rating and each of the group of alternate degradation severity ratings comprises a non-binary value indicating a degradation severity of the communication service occurring within a non-binary range of degradation severities.

5. The device of claim 4, wherein the non-binary range of degradation severities extend between substantially no degradation of the communication service and a failure of the communication service.

6. The device of claim 1, wherein at least one of the first and second communication devices comprises a packet-routing device, the operations further comprising:
determining a time delay with respect to a configuration of the current communication path, wherein the switchover opportunity is further based on the time delay exceeding a predetermined time delay threshold value.

7. The device of claim 1, wherein the first degradation severity rating is determined at least in part according to one of a packet delay value, a jitter value, an error rating value and any combination thereof.

8. The device of claim 1, wherein the operations further comprise:
retaining locally a persistent record of the group of alternate degradation severity ratings.

9. The device of claim 8, wherein the operations further comprise:

periodically updating the persistent record of the group of alternate degradation severity ratings to obtain a substantially current record of the group of alternate degradation severity ratings.

10. The device of claim 1, wherein the operations further comprise:

comparing the first degradation severity rating to a degradation severity threshold, wherein the detecting the first partial degradation of the communication service of the current communication path is responsive to the first degradation severity rating exceeding the degradation severity threshold.

11. The device of claim 1, wherein the comparing provides a comparison result, wherein the comparison result comprising a plurality of comparison results, the operations further comprising:

determining a maximum comparison result of the plurality of comparison results, wherein the alternate communication path comprises a preferred alternate communication path corresponding to the maximum comparison result.

12. The device of claim 1, wherein the operations further comprise:

identifying an active communication path of a plurality of distinct communication paths between a first communication device and a second communication device, wherein the active communication path is engaged in a first communication session that exchanges information according to a communication service.

13. The device of claim 1, wherein the detecting the degradation severity difference comprises:

comparing the degradation severity difference to a predetermined degradation severity threshold.

14. A non-transitory, machine-readable medium, comprising executable instructions that, when executed by a processing system including a processor, facilitate performance of operations, the operations comprising:

identifying a plurality of communication paths extending between a first communication device and a second communication device, wherein the plurality of communication paths comprises a current communication path and a group of alternate communication paths, the current communication path configured to support a communication session that exchanges information between the first and second communication devices according to a communication service;

detecting a first partial degradation of the communication service of the current communication path according to a first degradation severity rating;

responsive to the detecting:

comparing the first degradation severity rating to each degradation severity rating of a plurality of degradation severity ratings corresponding to a respective alternate communication path of the group of alternate communication paths;

determining a switchover opportunity based on a degradation severity difference between the first degradation severity rating and a second degradation severity rating of the plurality of degradation severity ratings; and selecting, responsive to the switchover opportunity, an alternate communication path of the group of alternate communication paths, for the communication service, having a second degradation severity rating less than the first degradation severity rating, wherein the selecting the alternate communication path is responsive to detecting the degradation severity difference exceeding a degradation severity rating difference threshold.

15. The non-transitory, machine-readable medium of claim 14, wherein the operations further comprise:

triggering a reconfiguration of the communication session that exchanges information between the first and second communication devices via the alternate communication path according to the communication service.

16. The non-transitory, machine-readable medium of claim 14, wherein the communication service comprises a packet-forwarding service.

17. A method, comprising:

identifying, by a processing system comprising a processor, a plurality of communication paths extending between a first communication device and a second communication device, wherein the plurality of communication paths comprises a current communication path and a group of alternate communication paths, the current communication path configured to support a communication session that exchanges information between the first and second communication devices according to a communication service;

detecting, by the processing system, a first partial degradation of the communication service of the current communication path according to a first degradation severity rating;

responsive to the detecting:

comparing, by the processing system, the first degradation severity rating to each degradation severity rating of a plurality of degradation severity ratings corresponding to a respective alternate communication path of the group of alternate communication paths;

determining a switchover opportunity based on a degradation severity difference between the first degradation severity rating and a second degradation severity rating of the plurality of degradation severity ratings; and selecting, by the processing system and responsive to the switchover opportunity, an alternate communication path of the group of alternate communication paths, for the communication service, having a second degradation severity rating less than the first degradation severity rating, wherein the selecting the alternate communication path is responsive to detecting the degradation severity difference exceeding a degradation severity rating difference threshold.

18. The method of claim 17, further comprising:

triggering, by the processing system, a reconfiguration of the communication session that exchanges information between the first and second communication devices via the alternate communication path according to the communication service.

19. The method of claim 17, wherein the communication service comprises a packet-forwarding service.

* * * * *